Jan. 3, 1961  H. A. PANISSIDI  2,966,890
AUTOMATIC TRACKING
Filed Dec. 31, 1952  2 Sheets-Sheet 2

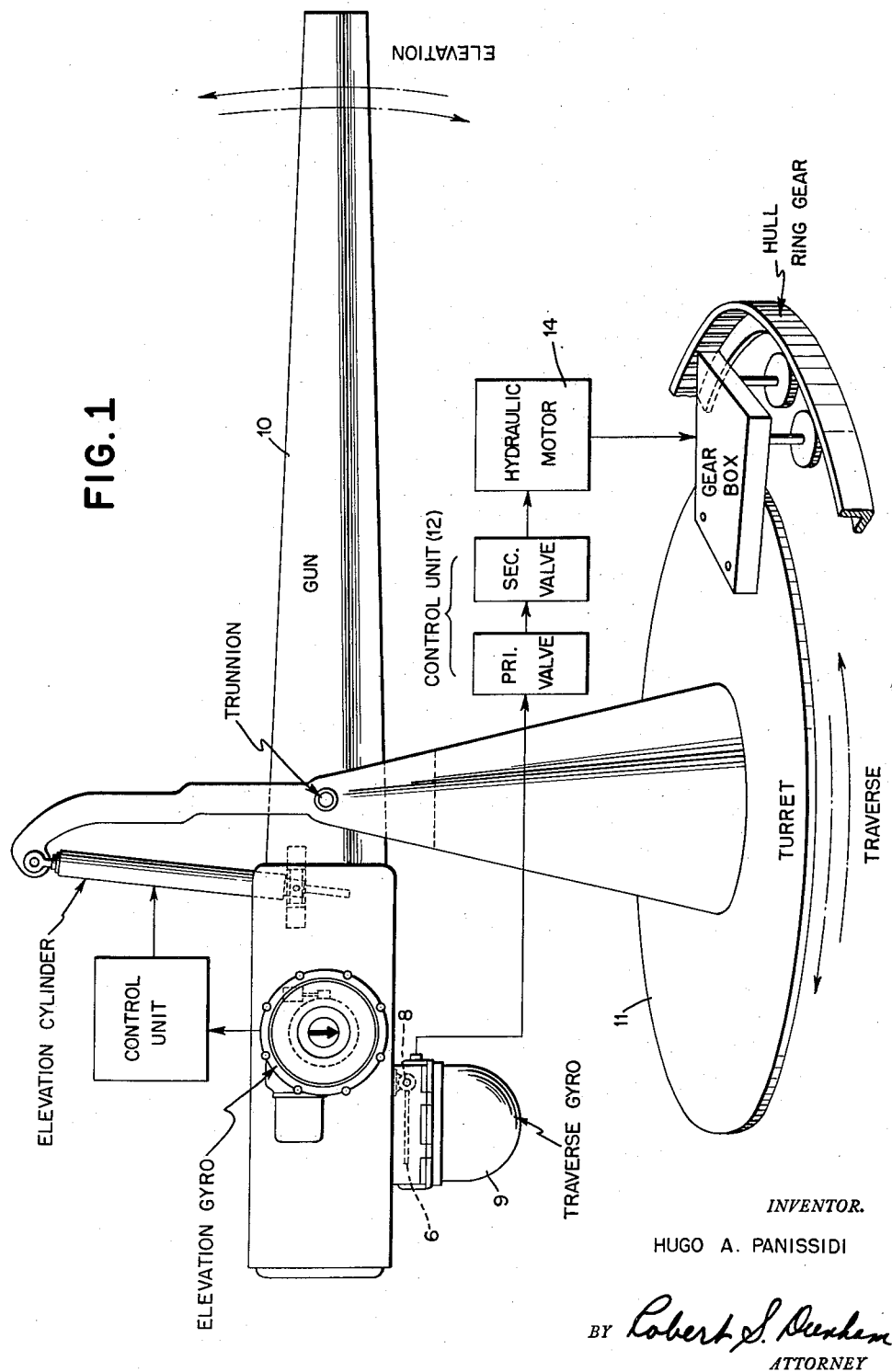

INVENTOR.
HUGO A. PANISSIDI
BY Robert S. Dunham
ATTORNEY

United States Patent Office 2,966,890
Patented Jan. 3, 1961

2,966,890

AUTOMATIC TRACKING

Hugo A. Panissidi, Binghamton, N.Y., assignor to International Business Machines Corporation, New York, N.Y., a corporation of New York Filed Dec. 31, 1952, Ser. No. 328,860

5 Claims. (Cl. 121—41)

This invention deals with a tracking motor control system, and more particularly with a hydraulic servo system including a gyro tracking motor which has means to synchronize its operation with that of the hydraulic servo system in order to gain smooth and rapid tracking without overshoot or hunting. Such operation is particularly difficult to obtain where very heavy objects having a large mass are to be controlled by the servo system; for example, where the servo system is controlling the position of a turret gun such as that carried by a tank.

Gun tracking is accomplished in a stabilization system such as that disclosed here, by creating an artificial error signal which will cause the hydraulic system to drive the object being controlled thereby to a new position. In such gun tracking operation, the elements involved in creating the artificial error signal are usually of a small and light nature whereas the object being controlled by the hydraulic servo system is quite large and very heavy. For this reason, the elements creating the artificial error signal will tend to be displaced much more rapidly than is the object being controlled by the servo system, and so a lag will be present which will tend to create overshoot and hunting about the desired new position of the object being controlled. In other words, the artificial error signal will tend to be changed much too rapidly so that the object being positioned will not be able to keep up with this change.

Consequently, it is an object of this invention to provide an electric tracking motor control circuit which includes an element of the hydraulic servo system in which the tracking motor is being used. Therefore, the speed of the tracking motor will be limited by the magnitude of the error signal in a direct manner—the error signal being directly applied to control the hydraulic servo system—so that the greater the error signal being produced by the tracking motor, the slower the tracking motor may run, i.e. the more limited will be the tracking motor's speed. Hence when there is no error signal present in the servo system, the speed of the tracking motor is directly controlled by the manual control therefor, up to a given maximum, while the presence of an error signal, will proportionately reduce the maximum speed of the tracking motor. In other words, the tracking motor is directly slaved to the response of the hydraulic servo system, and will not tend to overrun or get ahead of the servo response.

Another object of this invention is to provide a tracking motor control circuit which employs in addition to a manual speed control, a make and break speed control which is obtained from a control valve of the hydraulic servo system involved, in such a way that the speed is limited directly as the magnitude of the error signal applied to the control valve.

Still another object is the provision of a synchronized make and break speed control circuit for a tracking motor, in which the make and break contacts are immersed in hydraulic oil and are part of the hydraulic servo system involved.

To these and other ends, one embodiment of the invention is described below and shown in the drawings by way of example of illustrating the features and principles of my invention. Referring to the drawings:

Fig. 1 is a schematic showing of a gun being stabilized and controlled by a hydraulic system of the type which may employ the tracking motor circuit of this invention;

Figure 3:
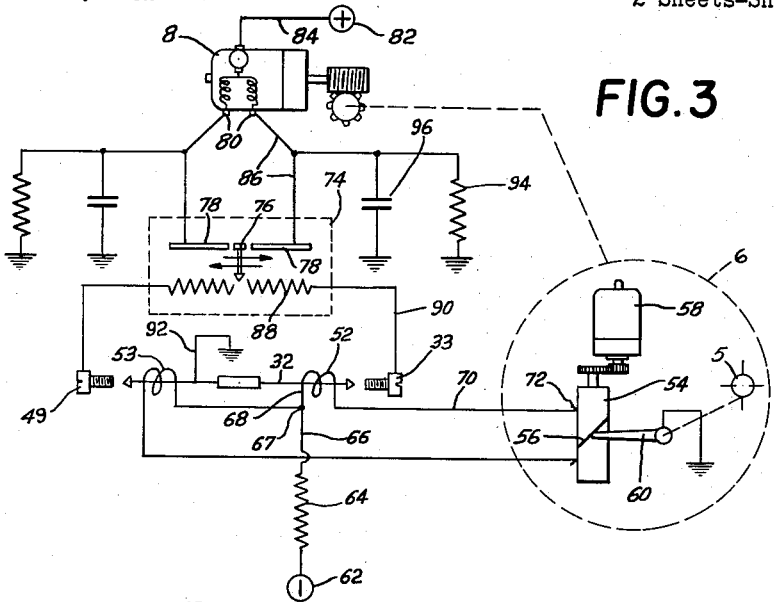
Fig. 3 is a circuit diagram of the tracking motor control circuit including the circuit for the control valve electro-dynamic drivers.

Fig. 1 illustrates a gun stabilization control system which employs two hydraulic servo systems, one for each axis of the gun. These hydraulic servo systems may be of the type illustrated and described in a copending application entitled Alternating Pulse Servo System, Ser. No. 284,606 filed April 26, 1952, now Patent No. 2,929,-213. The hydraulic servo systems there illustrated are of the alternate pulse type, to which the tracking motor control circuit of this invention is particularly adaptable. Since the large mass of the turret is added to that of the gun when traverse control is being exercised, the tracking motor control circuit of this invention is most beneficial in the traverse servo system. A hydraulic system of this type employs a stable unit, such as a gyroscope 5 (Fig. 3) which controls a pick-off element, e.g. arm 60 (Fig 3) for producing an error signal whenever the turret being stabilized changes its position from that indicated by the gyroscopic line of reference. The gyroscope and the error producing elements controlled thereby are mounted on a turntable 6 which can be rotated by a tracking motor 8. The turntable 6 is pivotally mounted on a traverse gyro unit 9, which, in turn, is solidly mounted on the body being controlled. The body being controlled is, in this instance, the combination of a gun 10 and a turret 11. The traverse gyro unit 9, as well as the elevation gyro unit illustrated in Fig. 1, may be constructed in various forms. However, it is preferred that the construction shown and described in the above mentioned copending application, be employed. Such construction is in accord with that indicated in this disclosure. Furthermore, the gyro unit turntable structure is the same as that illustrated and described in a patent to Leathers, et al., No. 2,464,592 issued March 15, 1949. In the system as illustrated in Fig. 1, the traverse gyro unit 9 is mounted on the gun 10 which, in turn, is mounted on the turret 11. The gyro unit 9 is mounted in such a way that it will respond to rotation of the gun and turret about a vertical or traverse axis, and herefore any rotation of the turret 11 will rotate the gyro unit 9 the same amount. Therefore, whenever tracking motor 8 is not energized the turntable 6 moves as part of the turret 11. It will be understood that this is basically an ordinary system for stabilizing a heavy body, such as the combined gun 10 and turret 11; and by means of any device, such as the tracking motor 8, an artificial error signal may be introduced in order to cause a repositioning of the turret 11 and the gun 10 for tracking in the traverse plane. Details of the hydraulic servo system for traverse will be more fully explained with reference to Figs. 2 and 3. However, it will be noted that error signals at the gyroscope are transmitted to a control unit 12 and from there to a hydraulic motor 14 (schematically shown).

Figure 2:
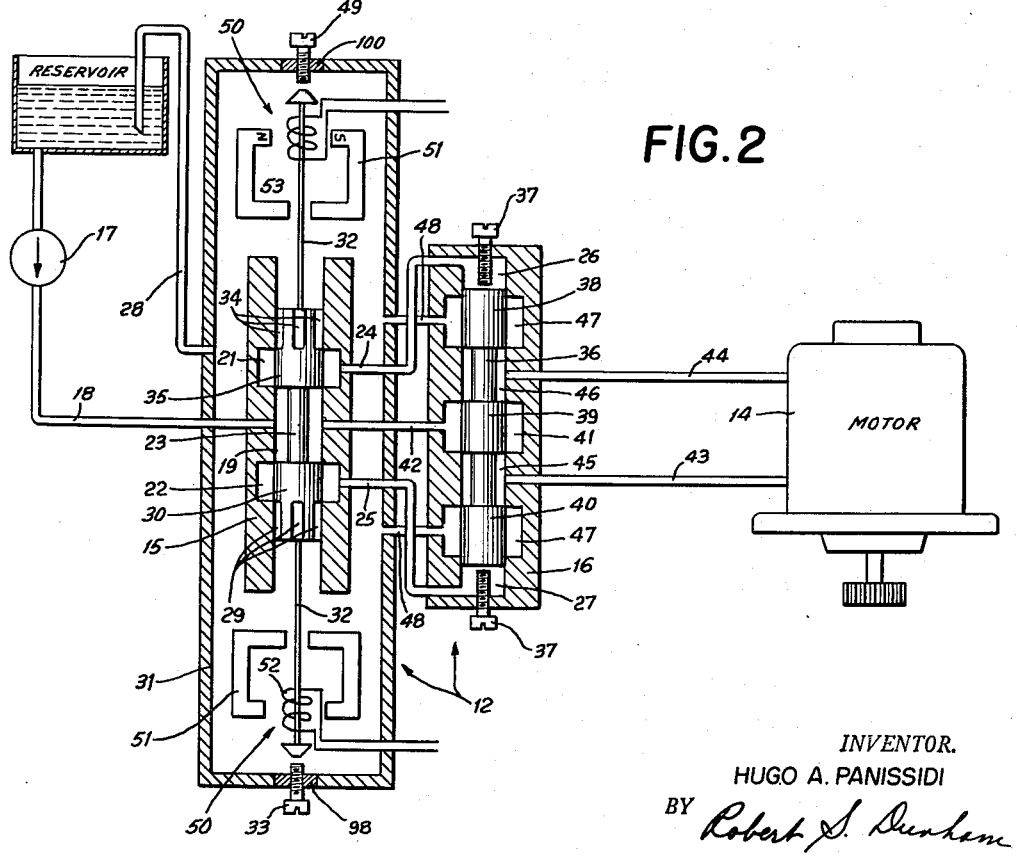
Fig. 2 is a schematic diagram of one of the two hydraulic servo systems involved in the gun stabilization, which acts to stabilize and control the gun about its vertical axis, i.e. in traverse.

In Fig. 2, there is illustrated schematically the traverse hydraulic system employing an alternate pulse type operation such as that fully described in the aforementioned copending application, Serial No. 284,606, filed April 26, 1952. This type of hydraulic servo system employs the control unit 12 which is schematically illustrated in Fig. 1 and comprises a primary valve 15 and a secondary valve 16. These two valves combine to reversibly control the flow of hydraulic fluid to the motor 14. Fluid under pressure, as produced by a hydraulic pump 17, is introduced by means of hydraulic pressure line 18 into a central chamber 19 of the primary valve 15. From central chamber 19, fluid flows alternately to annular chamber 21 or a similar annular chamber 22, upon the actuation of a spool 23 of the primary valve 15. Fluid then flows either through a hydraulic line 24 or a line 25 to one of a pair of end chambers 26 and 27 in the secondary valve 16. In each case, when one of the hydraulic lines 24 or 25 is connected to the pressure line 18, the other of these hydraulic lines will be connected to a return line 28 by means of a path similar in each case, one of which will now be traced. Assuming the spool 23 of primary control valve 15 is in its upper position as viewed in Fig. 2, then hydraulic line 25 will be connected to return line 28, first of all from annular chamber 22 by means of slots or grooves 29 in the outer end of a lower cylindrical portion 30 of the spool of the primary control valve 15. Hydraulic fluid from these slots or grooves may then pass freely out the end of the valve 15, which carries the movable spool 23, and into the inside of a housing 31 which encloses the valve 15. From there fluid may flow to the return line 28 which completes the hydraulic circuit.

When the movable spool of valve 15 is in its lower position, such that the end of a shaft 32 (which carries the cylindrical portion 30 and the other movable parts of the spool 23), will rest against a stop screw 33, the flow of hydraulic fluid from pressure line 18 will be the reverse of that previously described. That is, the hydraulic fluid will flow from central chamber 19 around the inner edge of lower cylindrical portion 30 of the spool 23, now in its lower position, to annular chamber 22 and then to hydraulic line 25 leading to end chamber 27 of the secondary valve 16. At the same time, the return path for hydraulic fluid will be from the other end chamber 26 through hydraulic line 24 to annular chamber 21, and then by means of the now exposed slots or grooves 34 in the upper cylindrical portion 35 of the spool 23 to the upper end of the primary valve 15 which opens into the inside of housing 31 which, in turn, is directly connected to the return hydraulic line 28.

The alternate connection of hydraulic lines 24 and 25 to pressure and return will produce movement of a spool 36 which corresponds to the movement of primary spool 23, i.e. spool 36 of the secondary valve 16 will be driven either up or down (as viewed in Fig. 2) to one of its extreme positions against one of a pair of stop screws 37 depending upon which way primary valve spool 23 is moved. The delay between movement of primary spool 23 and corresponding movement of secondary spool 36 is very slight and for all practical purposes the two spools oscillate in phase or 180 degrees out of phase (depending upon the connections of hydraulic lines 24 and 25 to end chambers 26 and 27— which connections may be reversed) when the system is in operation.

The secondary valve 16 acts to amplify the limited power output of the primary valve 15, and the spool 36 of the secondary valve has three piston-like lands 38, 39 and 40. Fluid under pressure is introduced into a central annular chamber 41 through a line 42 which is directly connected to the pressure side of hydraulic pump 17 by means of central chamber 19 of primary valve 15 and hydraulic line 18. Fluid under pressure is then introduced from annular chamber 41 of secondary valve 16 to either line 43 or line 44 leading to the motor 14, by way of space 45 or space 46 respectively located around the undercut sections of spool 36. It will be clear that whenever one of lines 43 or 44 is connected to pressure, the other will be connected to return by means of the other of spaces 45 and 46 and past the edge of either land 38 or 40 of the spool 36 and one of a pair of annular chambers 47 which are both connected to the inner space within primary housing 31 by a pair of short hydraulic lines 48. Therefore, the motor 14 will tend to be rotated in one direction or the other.

This hydraulic system is of the so-called alternate pulse type which means that the movable valve spool of primary control valve 15 including cylindrical portions 30 and 35 will be continuously oscillating from the upper position described, i.e. where the upper end (as viewed in Fig. 2) of the shaft 32 is in contact with an adjustable stop screw 49, to the lower position just described, wherein the shaft 32 is in its lowermost position in contact with stop screw 33. This means that the spool 36 of the secondary valve 16 will be continuously driven first in one direction and then the other. This, in turn, means that the motor 14 will be continuously driven first in one direction and then in the other, also. The frequency of this continuous alternation of drive of the motor 14 is such that at most a mechanical tremor is all the motion produced, so long as the primary and secondary control valves 15 and 16 are having their movable spools 23 and 36 oscillated for equal duration of time in each extreme position of rest against the stops 33, 49 and 37. Such is the case when there is no error signal present in the system. Under these conditions, the primary valve spool 23 with the shaft 32 and cylindrical portions 30 and 35, as well as secondary spool 36, will be continuously reciprocated from the upper to the lower position and back again with equal periods of remaining in the upper and in the lower positions. This reciprocation or alternate positioning of the spool 23 of primary valve 15 is accomplished by means of two electro-dynamic drivers 50 which have permanent magnetic material members 51 which cooperate each with its adjacent moving coils 52 and 53.

Energization of the moving coils 52 and 53 is accomplished by means of a circuit which is illustrated in Fig. 3. As described in greater detail in the aforementioned application, Serial No. 284,606, filed April 26, 1952, now Patent No. 2,929,213, there is a contact drum 54 which has a diagonally located central dividing strip 56 which is composed of insulating material and which separates into two portions the surface of contact drum 54 in order that each portion of the surface of the contact drum may be connected to a separate electrical circuit. The contact drum 54 is continuously rotated at a desired speed by means of an electric motor 58 or some other appropriate driving means. There is a centrally disposed arm 60 which is attached to gyroscope 5 or other stable element, and which determines the presence or absence of an error signal in the hydraulic servo system. The relative positions of the arm 60 and the contact drum 54 will be so adjusted that when there is no error signal present in the system the arm 60 will be located in its neutral position (as illustrated in Fig. 3). Under these conditions arms 60 contacts the two portions of the surface of drum 54 for an equal period of time for each revolution of the drum 54. For this reason, the two moving coils 52 and 53 will be alternately energized for equal periods of time during each revolution of the contact drum 54.

To emphasize the relationship between the gyro 5 (Fig. 3), the hydraulic traverse motor 14, and the tracking motor 8; it is pointed out that the gyro 5 tends to hold the arm 60 in a fixed position irrespective of rotation of the gun and turret about a vertical axis. Consequently, when the vehicle which carries the gun and turret, turns (or rotates about a vertical axis), the contact drum 54 is moved relative to the arm 60 and an error signal is generated in accordance with the above description. Therefor, the hydraulic motor 14 runs, so as to rotate the turret and tend to reduce the error signal to zero. Similarly, even though the vehicle does not turn; if the tracking motor 8 is energized, it drives the turntable 6 of the gyro unit and the contact drum 54 is again moved relative to the arm 60 which generates an error signal as before. Thus, as before, the hydraulic motor 14 runs so as to rotate the turret and tend to reduce the error signal to zero. In the first instance the hydraulic motor is running in its stabilizing mode, while in the second instance it is running in its tracking mode.

The circuits for energization of the moving coils 52 and 53 may readily be traced as follows: from the positive terminal 62 of any appropriate source of D.C. electric power, through a resistor 64 and wire 66 to a junction 67, from which the circuits for the two moving coils 52 and 53 branch off. Since the circuits for the two moving coils of the electro-dynamic drivers are identical, only one need be traced; and choosing moving coil 52, we may continue from junction 67 to wire 68 which connects to one end of the moving coil 52. Then the circuit continues through the moving coil 52 to wire 70 which connects to a contactor 72 (schematically illustrated) which rides on the upper portion (as viewed in Fig. 3) of the surface of drum 54. Then, during that portion of the revolution of contact drum 54 when the arm 60 is contacting the upper portion of the surface of the drum 54, the circuit is completed by means of the surface of the drum 54 to the arm 60, and then from arm 60 to ground as illustrated. Of course, the ground connection completes the circuit as is usual with this type of circuit.

Now, it will be evident that, whenever arm 60 is displaced (relatively) in either direction from its neutral or no signal position, illustrated, the duration of energization for one of the moving coils 52 or 53 will be increased while the duration of energization of the other of these moving coils will be correspondingly decreased. These are the conditions when an error signal is present. The effect of an error signal will be transmitted to the hydraulic system by means of the primary valve 15 of control unit 12, and the effect on the hydraulic system will be to cause an unbalance in the average duration of hydraulic pulses (as fully described above) which in turn will tend to cause the hydraulic motor 14 to drive in one direction or the other. When the hydraulic motor 14 is thus driven in rotation, this acts on the turret 11 to rotate it about its axis in such a direction as to cause the error signal to be reduced toward zero.

Tracking control of the hydraulic servo system is introduced in the usual manner by creating an artificial error signal as described above, but, in the instant case, a superior control circuit for a tracking motor may be had. The tracking motor 8 is illustrated in Fig. 3 which shows its electric circuit. There are two elements of speed control for the tracking motor 8, involved in this circuit. One of these elements of speed control is that included in a control unit 74. This control unit may take numerous forms of physical construction, but the electrical circuit involved is that shown in the circuit of Fig. 3. There is a central contact arm 76 which may be displaced laterally in either direction by suitable handles (not shown) under the control of the gunner, from the neutral position illustrated, as is indicated by the arrows. This contact arm 76 will select the direction of rotation for tracking motor 8 depending upon which direction it is moved from the neutral position illustrated. This is accomplished by means of a pair of contact bars 78 which are connected to the separate terminals 80 of the tracking motor 8. The motor 8 is a reversible motor having separate fields, one for each direction of rotation of the motor. The circuits for the two directions of rotation of the motor 8 are identical and may only be selected in the alternative. One of these circuits will now be traced to clarify the control circuit for motor 8. Beginning at a terminal 82 of any appropriate source of D.C. electric power, the circuit may be traced through a wire 84 and the internal circuit (schematically shown) of tracking motor 8, to a wire 86 which leads to one of the contact bars 78. From the contact bar 78, the circuit continues via contact arm 76 to a variable resistor 88 upon which the the other contact of arm 76 slides. The circuit then continues through a wire 90 to the stop screw 33 of primary control valve 15. From here, the circuit continues over shaft 32 of the movable core of primary valve 15 (when the shaft 32 is in contact with stop 33) and from the shaft 32 to a wire 92 which is connected to ground.

There is a parallel combination of a resistor 94 and a condenser 96 connected in parallel with a portion of the tracking motor circuit just traced. The purpose of this combination is merely to smooth out the pulses of electric power applied to the motor 8, which pulses are produced by the continuous make and break action between shaft 38 and its stop screws 40 and 44.

It will now be clear that there are two elements of speed control involved in the circuit for tracking motor 8. One of these elements is the make and break control which exists at one of the stop screws 33 or 49 and the shaft 32 which makes alternate contact with the stop screws and is itself grounded. The other speed control element is that determined by the control unit 74 wherein the variable resistor 88 is more or less included in the circuit, depending upon how far contact member 76 is moved away from its neutral or open circuit position illustrated.

It will be noted that the speed control determined by the make and break action of shaft 32 and stop screw 33 or 49 is directly determined by the error signal which is present in the electrically controlled hydraulic system. For example, when there is no such error signal present, the arm 60 will be at its neutral position and the shaft 32 will be held in alternate contact with each of the stops 33 and 49 for an equal period during each cycle. If an error signal is present, however, the arm 60 will be displaced and so shaft 32 will make contact with one of the stops for a shorter time duration during each cycle. Now, by proper choice of circuits for the tracking motor 8, whenever it is energized for a given direction of rotation by the control unit 74, there will be included in the energized circuit that stop 33 or 49 which has the periods of contact with shaft 32 decreased when the artificial error signal exists that is produced by the operation of the tracking motor 8 by reason of its rotating turntable 6. Therefore, the greater the error signal produced the shorter are the "make" periods in the make and break action of the stop 33 or 49 and shaft 32 of the circuit for the direction of rotation chosen for motor 8. Consequently, the hydraulic system will have a chance to reduce the error signal by rotating turret 11 and gun 10 and entire gyro unit 9 therewith and so strike a balance for a steady tracking speed with a minimum of hunting action.

Stated in another way, the speed of the tracking motor 8 will be limited depending upon the error signal which is determined by the position of arm 60. This limiting action will be least when there is no error signal since the make periods of the make and break action in a given circuit of motor 8 will be maximum at this time. When the error signal is present, however, the limiting action of the make and break speed control will be correspondingly increased as the error signal increases until the maximum condition of error signal is reached where a continuous energization of one of the moving coils 52 or 53 is obtained. At that time, no make and break control whatever will be exercised because the circuit will remain continuously open for that direction of the tracking motor which has been selected and the tracking motor 8 will be stopped until the error signal is reduced somewhat.

It will thus be clear that the speed of tracking motor 8 is directly enslaved by the degree of error signal being applied to the hydraulic servo, and for this reason the tracking motor 8 will not be allowed to overrun or go faster than the hydraulic system can operate, so that hunting which is caused by over-running of the tracking motor, will be entirely eliminated.

An additional benefit may be gained from the present tracking motor control system. This benefit is that of having the make and break contacts immersed in oil (hydraulic fluid). The result is that a much improved current carrying capacity without undue burning of the contacts is obtained. The make and break contacts are the stops 33 and 49 and the ends of the shaft 32. These are immersed in hydraulic fluid because the whole inside of housing 31 is filled with fluid at all times when the system is in operation.

It will be noted that the stop screws 33 and 49 are threaded through insulating material blocks 98 and 100 respectively in order to keep the stop screws from being grounded by the housing 31. The insulating material used must be impervious to attack by the hydraulic fluid, of course.

While I have disclosed a preferred embodiment of my invention in accordance with the applicable statutes, it is to be understood that this in no way limits my invention, but is to be taken as illustrative only.

I claim:

1. In a hydraulic servo system having electric controls therefor, said system including a hydraulic valve periodically actuated from one extreme position to another, mechanical stops for arresting said valve in its extreme positions, electrodynamic drivers for actuating said valve to its extreme positions, means for energizing said drivers alternately for equal periods of time under no error signal conditions and for increasing the periods of energization of one driver while correspondingly decreasing the periods of energization of the other driver under error signal conditions, said system also including means for producing artificial error signals when desired in order to create tracking control of the system, said last named means including an electric tracking motor, said tracking motor having two separate circuits one for each direction of rotation, an improved tracking motor control circuit comprising means for varying the direction and speed of rotation of said tracking motor, circuit means connecting each of said mechanical stops to said means for varying the direction and speed of the tracking motor, and other circuit means connecting said valve to a common circuit for alternatively completing said tracking motor circuits upon actuation of the valve to either extreme position.

2. The combination according to claim 1 wherein said tracking motor circuits use a ground return circuit and wherein said valve is grounded.

3. In a hydraulic servo system for positioning a heavy body in rotation including a stable element carried by said body with associated means for producing an error signal upon relative rotation between said stable element and said body, said error signal means being rotatably supported on said body with a tracking motor connected thereto for controlling rotation thereof relative to said body, said error signal being produced in the hydraulic system by means of a hydraulic valve having two extreme positions with mechanical stops therefor, the operation of said valve being alternating in nature between said extreme positions, a speed control circuit for said tracking motor comprising means for varying the speed of the tracking motor, and make and break speed control actuated by said valve and mechanical stops and being superimposed upon said speed varying means for limiting the speed of said tracking motor in accordance with the magnitude of the error signal.

4. In a hydraulic servo system for positioning a heavy body in rotation including a stable element carried by said body with associated means for producing an error signal upon relative rotation between said stable element and said body, said error signal means being rotatably supported on said body with a tracking motor connected thereto for controlling rotation thereof relative to said body, said error signal being produced in the hydraulic system by means of a hydraulic valve having two extreme positions with mechanical stops therefor, the operation of said valve being alternating in nature between said extreme positions, a speed control circuit for said tracking motor comprising two separate circuits one for each direction of rotation and including means for varying the speed of the tracking motor in each separate circuit, and make and break speed control for each of said separate circuits including one of said mechanical stops in each so that the tracking motor speed will be limited directly as the magnitude of the error signal.

5. In a hydraulic servo system for positioning a heavy body in rotation including a stable element carried by said body with associated means for producing an error signal upon relative rotation between said stable element and said body, said error signal means being rotatably supported on said body with a tracking motor connected thereto for controlling rotation thereof relative to said body, said error signal being produced in the hydraulic system by means of a hydraulic valve having two extreme positions with mechanical stops therefor, the operation of said valve being alternating in nature between said extreme positions, a speed control circuit for said tracking motor comprising two separate circuits one for each direction of rotation and including means for varying the speed of the tracking motor in each separate circuit, make and break switch means carried by said hydraulic valve and the mechanical stops for limiting the speed of the tracking motor in accordance with said error signal, each of said switch means being connected in series with one of said speed varying means to provide the speed limiting effect for either direction of rotation of the tracking motor.

References Cited in the file of this patent

UNITED STATES PATENTS

| | | |
|---|---|---|
| 2,409,190 | Brown et al. | Oct. 15, 1946 |
| 2,412,027 | Alexanderson | Dec. 3, 1946 |
| 2,439,198 | Bedford | Apr. 6, 1948 |
| 2,532,334 | Rhyne et al. | Dec. 5, 1950 |
| 2,715,776 | Knowles | Aug. 23, 1955 |